March 15, 1960  E. L. HORTON ET AL  2,928,424
VALVE
Filed Jan. 17, 1957  2 Sheets-Sheet 1

INVENTORS.
Earl L. Horton
Lindon D. Mason
BY
ATTORNEY

March 15, 1960   E. L. HORTON ET AL   2,928,424
VALVE

Filed Jan. 17, 1957   2 Sheets-Sheet 2

INVENTORS.
Earl L. Horton
Lindon D. Mason
BY
ATTORNEY

United States Patent Office 2,928,424
Patented Mar. 15, 1960

2,928,424

VALVE

Earl L. Horton and Lindon D. Mason, Denver, Colo.

Application January 17, 1957, Serial No. 634,644

1 Claim. (Cl. 137—625.38)

This invention relates to valves for the regulation and control of fluid flow, and more particularly to valves adapted for the regulation and control of fluid flow under high pressure, and has as an object to provide a novel and improved such valve characterized by high operative efficiency and low production, installation, and maintenance costs.

A further object of the invention is to provide an improved valve for the regulation and control of fluid flow that is positive, efficient, and free from leakage even under high pressures.

A further object of the invention is to provide an improved valve that is efficiently adaptable to either manual or automatic adjustment.

A further object of the invention is to provide an improved valve susceptible of advantageous operative association with conventional valve bodies of diverse types.

A further object of the invention is to provide an improved valve adapted for economical production from known and available materials in any desired variety of particular size and practical forms, that is expedient of installation and convenient of operation, and that is free from the complications characterizing conventional valve seats.

With the foregoing and other objects in view, our invention consists in the construction, arrangement, and operative combination of elements as hereinafter set forth, pointed out in our claim, and illustrated by the accompanying drawings, in which—

Figure 1:
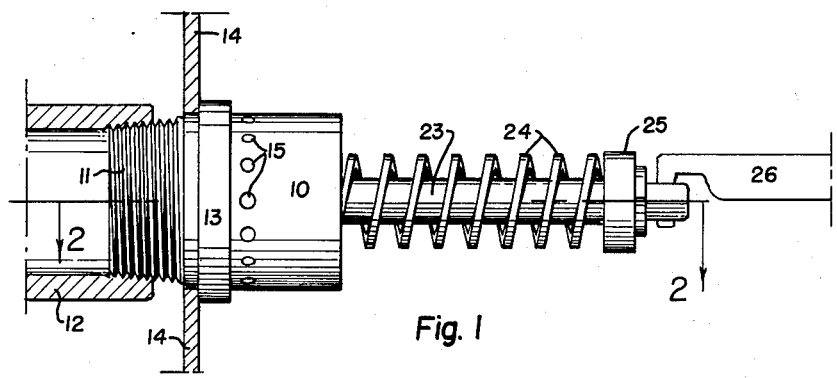
Figure 1 is a side elevation of a typical embodiment of the invention as operatively installed for automatic adjustment in one condition of use.

Regulation and control of fluid flow by means of valves is an ancient and wide-spread practice attended by known complicating factors. Conventional valves applied to the regulation and control of fluid flow are frequently less than satisfactory in that they are slow and tedious of adjustment between fully open and fully closed positions, in that they are prone to leak when fully closed, especially when subject to high pressures, and in that they are commonly characterized by coacting seat and closure elements subject to adverse deformation and wear, hence the instant invention is directed to the provision of a novel and improved valve eliminative of the disadvantages and shortcomings above noted.

In an embodiment adapted for automatic adjustment in reaction to temperature or pressure variations, the organization according to Figures 1–5, inclusive, is applicable to the regulation and control of the input of high pressure fluid flow, such as steam, compressed air, and the like, from a supply line to a chamber or housing. The novel and improved valve organization includes a body member 10 formed of any suitable material, such as metal, as a thick-walled, hollow cylinder having one open and one closed end. At its open end, the body 10 is exteriorly threaded, as at 11, for connection in a usual manner with and to receive flow from a supply line 12, and inwardly of its threaded portion 11 said body is worked to the form of an exterior annular rib or flange 13 adapted to engage and coact in sealing relation with a wall 14 of a chamber or housing to which flow from the line 12 is to be delivered; the said body 10 engaging through the wall 14 with its threaded portion 11 projected exteriorly of the chamber or housing symbolized by said wall. At the side of the rib or flange 13 remote from the threaded portion 11, the body 10 is intersected by a series of passages 15 opening entirely through and radially of the body wall in any desired number and uniform size. The passages 15 are preferably of such size and number as to provide an area of free communication between the interior and exterior of the body thereby intersected equal to the cross-sectional flow area of the valve as hereinafter described; said passages are preferably arranged in a uniform angular spacing fully about the circumference of the body 10; and said passages lie in and define a plane perpendicular to the axis of the body.

Figure 2:
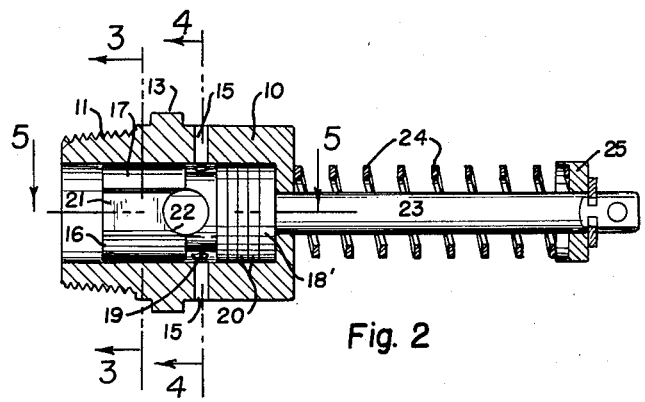
Figure 2 is a section substantially axially through and on the indicated line 2—2 of the organization according to Figure 1.
Figure 3:
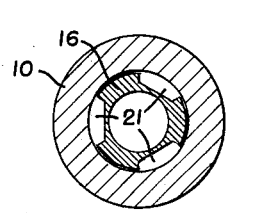
Figure 3 is a cross section taken substantially on the indicated line 3—3 of Figure 2.
Figure 4:
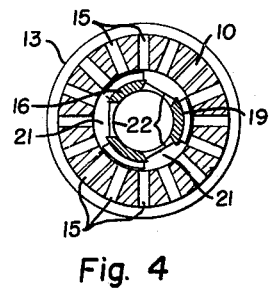
Figure 4 is a cross section taken substantially on the indicated line 4—4 of Figure 2.
Figure 5:
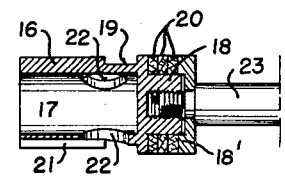
Figure 5 is a fragmentary, detail section longitudinally through the shiftable member of the organization according to the preceding views taken substantially on the indicated line 5—5 of Figure 2.

Regulation and control of fluid flow to and through the passages 15 is the function of a generally-cylindrical plunger member 16 slidable interiorly of the body 10 in a length less than that of the body chamber. The plunger 16 is constituted as a hollow skirt portion 17 and a solid head portion 18 interconnected by an integral neck 19 of a diameter reduced relative to that of said skirt and head, which neck portion 19 is adapted to register with inner ends of the passages 15 when the plunger is at the limit of its shiftable range inwardly of the body, as shown by Figure 2. The head portion 18 of the plunger 16 is arranged, as through the provision of a separable end cap 18' shown in Figure 5, or otherwise, to replaceably mount a sealing ring, or rings, 20 in exposure peripherally of the head portion for sealing coaction with the wall defining the chamber of the body 10 in a customary manner, said ring or rings having a width of exposure longitudinally of the plunger sufficient to fully close all the passages 15 when the plunger 16 is shifted outwardly of the body 10 to register said ring or rings across the inner ends of the passages 15. The skirt portion 17 of the plunger 16 is hollow between an open end remote from the neck portion 19 and an inner end closed at the junction of the head portion 18 with the neck portion 19, and said skirt portion is exteriorly characterized by a circumferential succession of like channels 21 extending longitudinally thereof from the open end of the skirt portion to the neck portion 19 wherewith they communicate. The channels 21 may be of any appropriate particular size and number, three such being illustrated, and at the inner end of each said channel a port 22 opens radially through the skirt portion in intersecting relation with the floor of the neck portion 19 and the full width of the associated channel 21.

Shift of the plunger 16 within and axially of the body 10 is had through the agency of a stem 23 fixed at one end to and coaxially extending from the head portion 18 of the plunger slidably through the closed end of said body; a spring 24 loosely about said stem expansively engaging between the closed end of the body 10 and a collar 25 adjacent the free end of the stem operating to urge said stem and the associated plunger to the limit of plunger travel inwardly of the body and hence to a disposition such as to register the plunger neck portion 19 with the inner ends of the passages 15. Automatic shift of the plunger 16 to registration of the ring or rings 20 in closing relation with the passages 15 is accomplished through the stem 23 in reaction to a linkage 26, of any expedient particularity, operable to reflect variations in temperature or pressure, as the case may be; actuation of the linkage 26 in response to predetermined maximums of temperature or pressure operating in an obvious manner to move the plunger and stem assembly against the pressure of the spring 24 and the pressure of the flow controlled by the valve to close the passages 15 and interrupt the flow path therethrough.

Operation of the improvement according to Figures 1–5, inclusive, should be readily apparent from the illustrative showing and foregoing description. Mounted and coupled as represented by Figure 1, pressure flow through the line 12 enters the open end of the body 10 to bear against the closed cross-sectional area of the plunger 16 and urge the latter to the inner limit of its range of travel where the neck portion 19 is registered with the passages 15 in the relationship exemplified by Figure 2. Flow incoming to the body 10 passes through the open interior of the plunger skirt portion 17 and thence through the ports 22 to the neck portion 19 and passes outwardly from the space about the latter through the passages 15, while supplemental portions of the flow pass through the channels 21 to the zone of the neck portion 19 and thence outwardly through the passages 15. The valve remains open under the pressure of the incoming flow and the influence of the spring 24 until force sufficient to overcome such pressure and influence is applied to shift the stem 23 inwardly of the body, whereupon the plunger is slidably shifted axially of the body to move the head portion 18, and particularly the sealing ring or rings 20 thereof, into closing relation across the inner ends of the passages 15, in which condition the valve is fully closed for positive interruption of flow therethrough.

Figure 6:
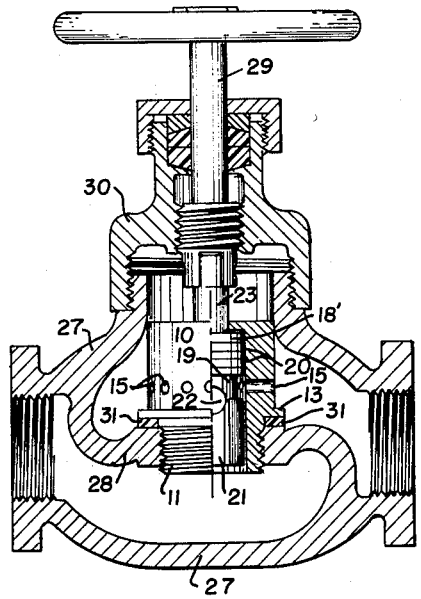
Figure 6 is a section substantilly axially through a conventional globe valve as advantageously modified and conditioned to give effect to the principles of the instant invention.

As represented by Figure 6, the improvements of the instant invention may be embodied in a unit advantageously coactable with a conventional globe valve in replacement for the usual valve seat and coacting closure element. The body of a conventional globe valve is shown at 27 in Figure 6 as provided with the customary web 28 in obstructing relation between the intake and outlet ends of the valve, which web customarily is formed with a seat adapted to coact with a closure element adjustably related therewith by means of the usual stem 29 threadly working through the valve bonnet 30. Adaptation of the conventional globe valve to give effect to the principles of the instant invention is had by interiorly threading the valve opening through the web 28 to receive the threaded end portion 11 of the body and plunger assembly hereinabove described; seating of the rib or flange 13 on the web 28 through a gasket 31 effectively sealing the joint between said web and the associated valve body 10. Mounted on the web 28 as shown and described, the body 10 is in coaxial alignment with the actuating stem 29 of the conventional valve and the stem 23 of the adaptation is hence aligned with said stem 29 for convenient connection with the latter in any desired manner effective to transmit actuation of the stem 29 as corresponding actuation of the stem 23. As should be clear from the foregoing, flow through the conventional valve body 27 is accomodated through the plunger skirt portion 17, neck portion 19, and the body passages 15 in the manner above set forth when the stem 23 is moved to the limit of its travel outwardly of the body 10 under the influence of the stem 29, the plunger assembly being free to rotate as well as to reciprocate in said body. The modified globe valve is closed through customary manipulation of the stem 29 to shift the stem 23 and its associated plunger into obstructing relation of the ring or rings 20 across inner ends of the passages 15, all as above explained.

Figure 7:
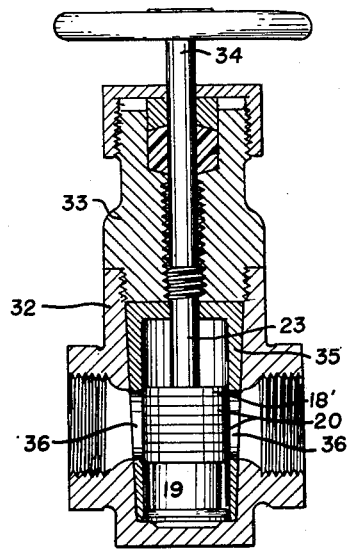
Figure 7 is a section substantially axially through a conventional gate valve as advantageously modified and conditioned to give effect to the principles of the instant invention.

As represented by Figure 7, conventional gate valves may be advantageously modified through adaptation thereto of the principles characterizing the improvement. A typical gate valve is shown in Figure 7 as including the usual valve body 32 characterized by the customary wedge seat transversely of the flow passage and a bonnet 33 mounting the valve actuating gear 34. To realize the purposes of the invention, the usual wedge gate of the conventional valve is eliminated in favor of a wedge-shaped adapter 35 conformably receivable in the valve body 32 where it is secured by means of the bonnet 33. The adapter 35 defines a cylindrical chamber opening through its lesser end wherein the head portion 18 carrying the ring or rings 20 and the neck portion 19 of the plunger organization above described are slidably and rotatably received with the stem 23 operatively connected to the manipulating gear 34, and ports 36 open through opposite side walls of the adapter 35 in position to register with the flow channel through the conventional valve body 32. In the modification according to Figure 7, the neck portion 19 of the plunger assembly is of a width axially of the plunger effective to substantially span the open dimension of the ports 36, the ring assembly 20 of the plunger organization has a similar dimension effective to span at times over and in closing relation with said ports 36, and the chamber within the adapter 35 has an axial length sufficient to accommodate shift of the plunger organization between registration of the neck portion 19 with the ports 36 and registration of the ring assembly 20 with and across said ports, whereby to apply manipulation of the gear 34 and consequent shift of the stem 23 to fully open and to fully close said valve through the alternative registrations of plunger components with the ports 36 as above described. It is naturally manifest that when the plunger neck portion 19 of the modification according to Figure 7 is registered with the ports 36 the valve is fully open for flow from one side of the valve body 32 through one port 36 and the zone about the neck portion 19 to and outwardly through the other port 36 and the flow passage of the conventional body registered therewith, while when the ring assembly 20 is registered in obstructing relation across said ports no flow may be had from one side of the adapter 35 to the other side thereof.

Since changes, variations, and modifications in the form, construction, and arrangement of the elements shown and described may be had without departing from the spirit of our invention, we wish to be understood as being limited solely by the scope of the appended claim, rather than by any details of the illustrative showing and foregoing description.

We claim as our invention:

In operative combination with a valve body defining a cylindrical cavity opening through one end thereof formed with an annular succession of like flow passages radially of and opening to said cavity in angularly-spaced relation intermediate the cavity ends, a plunger coaxially reciprocable in said cavity for selective regulation of fluid flow through the intercommunicating open cavity end, cavity, and radial flow passages thereof, said plunger comprising a solid, cylindrical head portion shiftable axially of the cavity in sealing coaction with the walls thereof into and inwardly of the cavity away from obstructing relation across inner ends of the radial flow passages, an integral, tubular skirt portion slidably coactable with the cavity walls in coaxial extension from said head portion with its end remote from the latter directed toward and opening to the open end of the cavity, an annular neck portion of reduced diameter at the junction of said head and skirt portion in a width axially of the plunger exceeding the inner end opening size of the radial flow passages adapted for intercommunicating registration with the inner ends of all said passages upon shift of the plunger inwardly of the cavity to clear the head portion from obstructing relation with the passages, channels angularly spaced about and longitudinally interrupting the exterior surface of said skirt portion as flow paths communicating between said neck portion and the free end of the skirt portion, openings radially of said skirt portion each intersecting the wall of the skirt portion at the junction of each said channel with the neck portion as flow paths supplementary to said channels between the open-end interior of the skirt portion and the annular channel of the neck portion, and an actuating stem fixed to said plunger in extension through the otherwise closed end of the body.

References Cited in the file of this patent

UNITED STATES PATENTS

| | | |
|---|---|---|
| 642,007 | Rushton | Jan. 23, 1900 |
| 650,650 | Niehoff | May 29, 1900 |
| 726,926 | Hoffman | May 5, 1903 |
| 1,108,950 | Viger | Sept. 1, 1914 |
| 1,595,317 | Scholey | Aug. 10, 1926 |
| 1,662,659 | Birnstock | Mar. 13, 1928 |
| 2,104,039 | Hunter | Jan. 4, 1938 |
| 2,237,114 | Read | Apr. 1, 1941 |
| 2,561,823 | Sayre | July 24, 1951 |
| 2,836,198 | McNeill | May 27, 1958 |